(12) United States Patent
Gotoh

(10) Patent No.: US 9,036,116 B2
(45) Date of Patent: *May 19, 2015

(54) LIQUID CRYSTAL DISPLAY DEVICE

(71) Applicants: Japan Display Inc., Tokyo (JP);
Panasonic Liquid Crystal Display Co., Ltd., Hyogo-ken (JP)

(72) Inventor: Jun Gotoh, Mobara (JP)

(73) Assignees: Japan Display Inc., Tokyo (JP);
Panasonic Liquid Crystal Display Co., Ltd., Hyogo-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/463,126

(22) Filed: Aug. 19, 2014

(65) Prior Publication Data
US 2014/0354925 A1    Dec. 4, 2014

Related U.S. Application Data

(63) Continuation of application No. 13/798,317, filed on Mar. 13, 2013, now Pat. No. 8,823,906, which is a continuation of application No. 13/557,710, filed on Jul. 25, 2012, now Pat. No. 8,421,964, which is a continuation of application No. 12/790,063, filed on May 28, 2010, now Pat. No. 8,233,119.

(30) Foreign Application Priority Data

Jun. 3, 2009    (JP) ................................. 2009-133752

(51) Int. Cl.
*G02F 1/1337*    (2006.01)
*G02F 1/1339*    (2006.01)
*G02F 1/1335*    (2006.01)
*G02F 1/1333*    (2006.01)

(52) U.S. Cl.
CPC ........ *G02F 1/1337* (2013.01); *G02F 1/133514* (2013.01); *G02F 2001/133388* (2013.01); *G02F 2001/133519* (2013.01); *G02F 1/133516* (2013.01)

(58) Field of Classification Search
CPC ................... G02F 1/133514; G02F 1/133516; G02F 2001/133388; G02F 2001/133519
USPC ................. 349/106, 110, 123, 153, 155, 156; 345/88, 92
See application file for complete search history.

(56) References Cited

U.S. PATENT DOCUMENTS 6,705,584 B2    3/2004    Hiroshima et al.
7,102,723 B2    9/2006    Byun et al.
(Continued)

FOREIGN PATENT DOCUMENTS

JP    2002-357828    12/2002
JP    2006-106604    4/2006
(Continued)

*Primary Examiner* — Dung Nguyen
*Assistant Examiner* — Tai Duong
(74) *Attorney, Agent, or Firm* — Lowe Hauptman & Ham, LLP

(57) ABSTRACT

A liquid crystal display device includes a TFT substrate having a display area in which pixels are arranged, and a terminal portion, a counter substrate disposed opposite to the TFT substrate, a sealing material formed in a periphery to bond the TFT and counter substrates together, and with a liquid crystal layer interposed between an orientation film formed on the TFT substrate and an orientation film formed on the counter substrate. A first, second, or third color filter is formed corresponding to each of the pixels in the display area of the TFT substrate, and an orientation film stopper is formed by an overlapping portion of the first, second, or third color filter at least in an area between the display area and the terminal portion of the TFT substrate so that a profile of the orientation film is defined by the orientation film stopper.

8 Claims, 12 Drawing Sheets

(56) References Cited

U.S. PATENT DOCUMENTS

| | | |
|---|---|---|
| 7,580,104 B2 | 8/2009 | Komeno et al. |
| 8,125,608 B2 | 2/2012 | Kotani et al. |
| 2005/0117093 A1 | 6/2005 | Kim et al. |
| 2007/0091247 A1 | 4/2007 | Onda |
| 2011/0013125 A1 | 1/2011 | Lee et al. |

FOREIGN PATENT DOCUMENTS

| | | |
|---|---|---|
| JP | 2007-114586 | 5/2007 |
| JP | 2008-145461 | 6/2008 |
| JP | 2009-109819 | 5/2009 |

LIQUID CRYSTAL DISPLAY DEVICE

CROSS REFERENCE TO RELATED APPLICATION

This application is a continuation of U.S. application Ser. No. 13/798,317, filed Mar. 13, 2013, now U.S. Pat. No. 8,823, 906, which is a continuation of U.S. application Ser. No. 13/557,710, filed Jul. 25, 2012, now U.S. Pat. No. 8,421,964, which is a continuation of U.S. application Ser. No. 12/790, 063, filed May 28, 2010, now U.S. Pat. No. 8,233,119, the contents of which are incorporated herein by reference.

CLAIM OF PRIORITY

The present application claims priority from Japanese Patent Application JP 2009-133752 filed on Jun. 3, 2009, the content of which is hereby incorporated by reference into this application.

FIELD OF THE INVENTION

The present invention relates to a display device, and more particularly, to a liquid crystal display device configured to have color filters on the side of a TFT substrate and allow an effective application of an orientation film.

BACKGROUND OF THE INVENTION

In a conventional liquid crystal display device, there is provided a TFT substrate in which pixel electrodes, thin film transistors (TFTs) and the like are arranged in a matrix form and a counter substrate in which color filters and the like are formed at locations corresponding to the pixel electrodes of the TFT substrate is disposed opposite to the TFT substrate. A liquid crystal is interposed between the TFT substrate and the counter substrate. Then, an image is formed by controlling the transmittance of light of the liquid crystal molecules for each pixel.

In such a conventional liquid crystal display device, it is necessary to exactly match the pixel electrodes formed in the TFT substrate to the color filters formed in the counter substrate. However, the positioning accuracy of the TFT substrate and the counter substrate is about 3 to 5 µm, which should be taken into account in the allowance of the pattern. As a result, the transmittance of a liquid display panel is reduced.

On the other hand, when the color filters are formed on the side of the TFT substrate, the TFT substrate and the counter substrate can be roughly positioned to each other. In other words, when the color filters are formed on the side of the TFT substrate, the alignment accuracy of the color filters with respect to the wiring and the TFTs in the TFT substrate can be set in accordance with the mask alignment accuracy in photo processing, and can be set to about 1 µm. JP-A No. 357828/ 2002 describes a configuration in which color filters are formed on the side of the TFT substrate as described above.

Liquid crystal display devices have been used in a wide range of applications. Under such circumstances there is a demand to produce liquid display panels of different sizes. In particular, a variety of sizes are expected to be available in small liquid crystal display panels. The liquid crystal display panel uses an orientation film of polyimide or other suitable resin in order to orient liquid crystal. The orientation film has been formed by flexographic printing in the past.

However, the flexographic printing requires different plates for each type of orientation films to be printed. The production of the plate is a factor of the increase in the production cost of the liquid crystal display panel. In recent years, as a measure to solve this problem, there has been developed a process for applying the orientation film by inkjet printing. However, when the orientation film is formed by inkjet printing, it is necessary to reduce the viscosity of the orientation film when it is applied.

In this case, it is difficult to keep the orientation film in a predetermined area due to the reduced viscosity of the orientation film. For example, the orientation film flows to a portion of a sealing material for bonding the TFT substrate and the counter substrate together. When the orientation film is formed extending to the portion of the sealing material, the reliability of the sealing portion is reduced.

In order to prevent this, JP-A No. 145461/2008 describes a configuration in which ITO (Indium Tin Oxide), which is used as a pixel electrode, is formed to surround the display area so that the orientation film is confined to a predetermined range. In this way, the orientation film is prevented from extending to the sealing portion.

According to JP-A No. 145461/2008, the configuration for confining an orientation film to a predetermined range is as follows. In a frame area between the display area and the sealing portion, a concavo-convex pattern is formed in an insulating film and is coated with ITO constituting a pixel electrode. The concavo-convex pattern formed in the periphery of the display area prevents the orientation film with a low viscosity applied by inkjet printing, from extending beyond the periphery of the display area.

However, the thickness of the ITO formed in the periphery of the display area is equal to the thickness of the ITO of the pixel electrode, about 70 to 100 nm. It is not sufficient as a stopper for the orientation film whose thickness is about 150 nm. Further, the concavo-convex pattern is formed from an insulator with a thickness of about 300 nm, which is not sufficient to block the low viscosity orientation film.

SUMMARY OF THE INVENTION

It is desirable to be able to apply the orientation film by inkjet printing, without an increase in the production cost while maintaining the reliability of the sealing portion.

The present invention overcomes the above problem by the following means.

(1) There is provided a liquid crystal display device including a TFT substrate having a display area in which pixels each having a pixel electrode and a TFT are arranged in a matrix form, and a counter substrate disposed opposite to the TFT substrate. The TFT substrate and the counter substrate are bonded together by a sealing material formed in the periphery. A liquid crystal layer is interposed between an orientation film formed in the TFT substrate and an orientation film formed in the counter substrate. A first color filter, a second color filter, or a third color filter is formed corresponding to each of the pixels in the display area of the TFT substrate. An orientation film stopper is formed by an overlapping portion of the first color filter, the second color filter, or the third color filter, between the display area of the TFT substrate and the sealing material. A profile of the orientation film formed in the TFT substrate is defined by the orientation film stopper.

(2) In the liquid crystal display device described in (1), the orientation film stopper is formed of two layers of color filters.

(3) In the liquid crystal display device described in (1), the orientation film stopper is formed of three layers of color filters.

(4) There is provided a liquid crystal display device including a TFT substrate having a display area in which pixels each having a pixel electrode and a TFT are arranged in a matrix form, and a counter substrate disposed opposite to the TFT substrate. The TFT substrate and the counter substrate are bonded together by a sealing material formed in the periphery. A liquid crystal layer is interposed between an orientation film formed in the TFT substrate and an orientation film formed in the counter substrate. A distance between the TFT substrate and the counter substrate is defined by a columnar spacer. A first color filter, a second color filter, or a third color filter is formed corresponding to each of the pixels in the display area of the TFT substrate. A first orientation film stopper is formed by an overlapping portion of the first color filter, the second color filter, or the third color filter, between the display area of the TFT substrate and the sealing material. A profile of the orientation film formed in the TFT substrate is defined by the first orientation film stopper. A second orientation film stopper is formed by the same process of the columnar spacer on the outside of the display area of the counter substrate. A profile of the orientation film formed in the counter substrate is defined by the second orientation film stopper.

(5) There is provided a liquid crystal display device including a TFT substrate having a display area in which pixels each having a pixel electrode and a TFT are arranged in a matrix form, and a counter substrate disposed opposite to the TFT substrate. The TFT substrate and the counter substrate are bonded together by a sealing material formed in the periphery. A liquid crystal layer is interposed between an orientation film formed in the TFT substrate and an orientation film formed in the counter substrate. A first color filter, a second color filter, or a third color filter is formed corresponding to each of the pixels in the display area of the TFT substrate. A light shielding film is formed by the overlapping of the first color filter, the second color filter, or the third color filter. An orientation film stopper is formed by an overlapping portion of the first color filter, the second color filter, or the third color filter, between the display area of the TFT substrate and the sealing material. A profile of the orientation film formed in the TFT substrate is defined by the orientation film stopper. A height of the orientation film stopper is greater than a height of the light shielding film formed in the display area of the TFT substrate.

(6) There is provided a liquid crystal display device including a TFT substrate having a display area in which pixels each having a pixel electrode and a TFT are arranged in a matrix form, and a counter substrate disposed opposite to the TFT substrate. The TFT substrate and the counter substrate are bonded together by a sealing material formed in the periphery. A liquid crystal layer is interposed between an orientation film formed in the TFT substrate and an orientation film formed in the counter substrate. A first color filter, a second color filter, or a third color filter is formed corresponding to each of the pixels in the display area of the TFT substrate. A light shielding film is formed on the TFT, in addition to the first color filter, the second color filter, or the third color filter. An orientation film stopper is formed by an overlapping portion of the first color filter, the second color filter, or the third color filter, between the display area of the TFT substrate and the sealing material. A profile of the orientation film formed in the TFT substrate is defined by the orientation film stopper.

(7) There is provided a liquid crystal display device including a TFT substrate having a display area in which pixels each having a pixel electrode and a TFT are arranged in a matrix form, and a counter substrate disposed opposite to the TFT substrate. The TFT substrate and the counter substrate are bonded together by a sealing material formed in the periphery. A liquid crystal layer is interposed between an orientation film formed in the TFT substrate and an orientation film formed in the counter substrate. A first color filter, a second color filter, or a third color filter is formed corresponding to each of the pixels in the display area of the TFT substrate. A light shielding film is formed on the TFT, in addition to the first color filter, the second color filter, or the third color filter. An orientation film stopper is formed by an overlapping portion of the light shielding film and the first color filter, the second color filter, or the third color filter, between the display area of the TFT substrate and the sealing material. A profile of the orientation film formed in the TFT substrate is defined by the orientation film stopper.

According to the present invention, it is possible to apply the orientation film by inkjet printing, without reducing the reliability of the sealing portion and without a need to have an additional production process. As a result, the production cost of the liquid crystal display device can be reduced.

DETAILED DESCRIPTION OF THE PREFERRED EMBODIMENTS

Preferred embodiments of the present invention will be described in detail below.

First Embodiment

Figure 1:
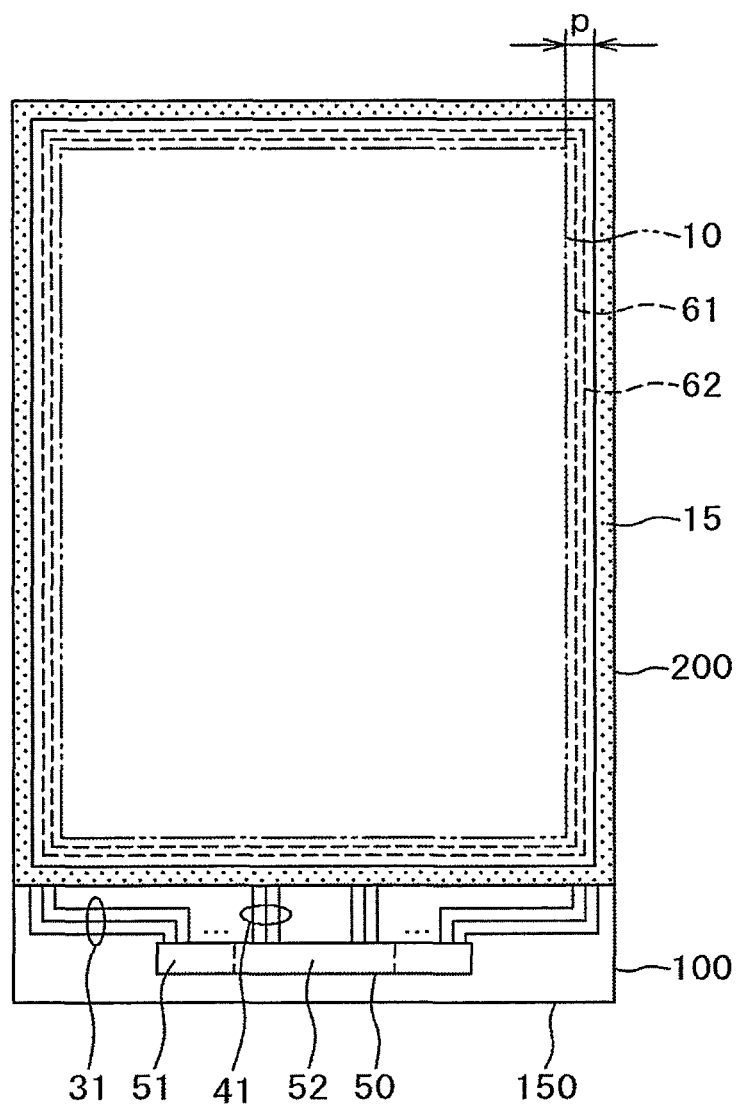
FIG. 1 is a top view of a liquid crystal display device to which the present invention is applied.

FIG. 1 is a top view of a liquid crystal display device used for electronic devices such as mobile phones, which is an example of the liquid crystal display device in which the present invention is used. In FIG. 1, a counter substrate 200 is disposed above a TFT substrate 100. A liquid crystal layer is interposed between the TFT substrate 100 and the counter substrate 200. The TFT substrate 100 and the counter substrate 200 are bonded together by a sealing material 15 formed in the periphery.

In FIG. 1, the liquid crystal display device is sealed by dropping liquid crystal into the liquid crystal display device. Thus, no sealing hole of the liquid crystal is formed in the liquid crystal display device. The TFT substrate 100 is made greater than the counter substrate 200. A terminal portion 150 is formed in a portion of the TFT substrate 100 extending beyond the counter substrate 200. The liquid crystal display panel is supplied with power, image signals, scan signals, and the like, from the terminal portion 150.

Further, an IC driver 50 is formed in the terminal portion 150 to drive scan lines, image signal lines, and the like. The IC driver 50 is divided into three areas. In the center area of the three areas, an image signal driving circuit 52 is provided. A scan signal driving circuit 51 is provided in the two areas on both sides of the center area.

In the display area 10 of FIG. 1, scan lines, not shown, extend in the lateral direction and are arranged in the vertical direction. Further, image signal lines, not shown, extend in the vertical direction and are arranged in the lateral direction. The scan lines are connected by leaders 31 to the scan signal driving circuit 51 of the IC driver 50. In FIG. 1, the scan line leaders 31 is provided on both sides of the display area, in order to provide the display area 10 in the central portion of the liquid crystal display device. For this reason, the scan signal driving circuit 51 is provided on both sides of the IC driver 50. While the image signal lines are connected to the IC diver 50 by image signal leaders 41 extending together to the lower side of the display. The image signal line leaders 41 are connected to the image signal driving circuit 52 provided in the center area of the IC driver 50.

The space from the boundary of the display area 10 to the end of the counter substrate is called a frame area. The frame area is expected to be reduced, in particular in the small liquid crystal display device. In FIG. 1, a distance p from the boundary of the display area 10 to the sealing material 15 is about 1 mm in the small liquid crystal display device.

An orientation film stopper, which will be described below, is formed between the boundary of the display area 10 and the sealing material 15. The orientation film stopper is formed both in the TFT substrate 100 and in the counter substrate 200. In FIG. 1, only first and second orientation film stoppers 61 and 62 are formed in the TFT substrate 100, which are shown by the dotted lines. In this embodiment, as shown in FIG. 1, the orientation film stopper has a two-stage structure of the first and second orientation film stoppers. However, a one-stage structure or a three- or more-stage structure can also be used.

Figure 2:
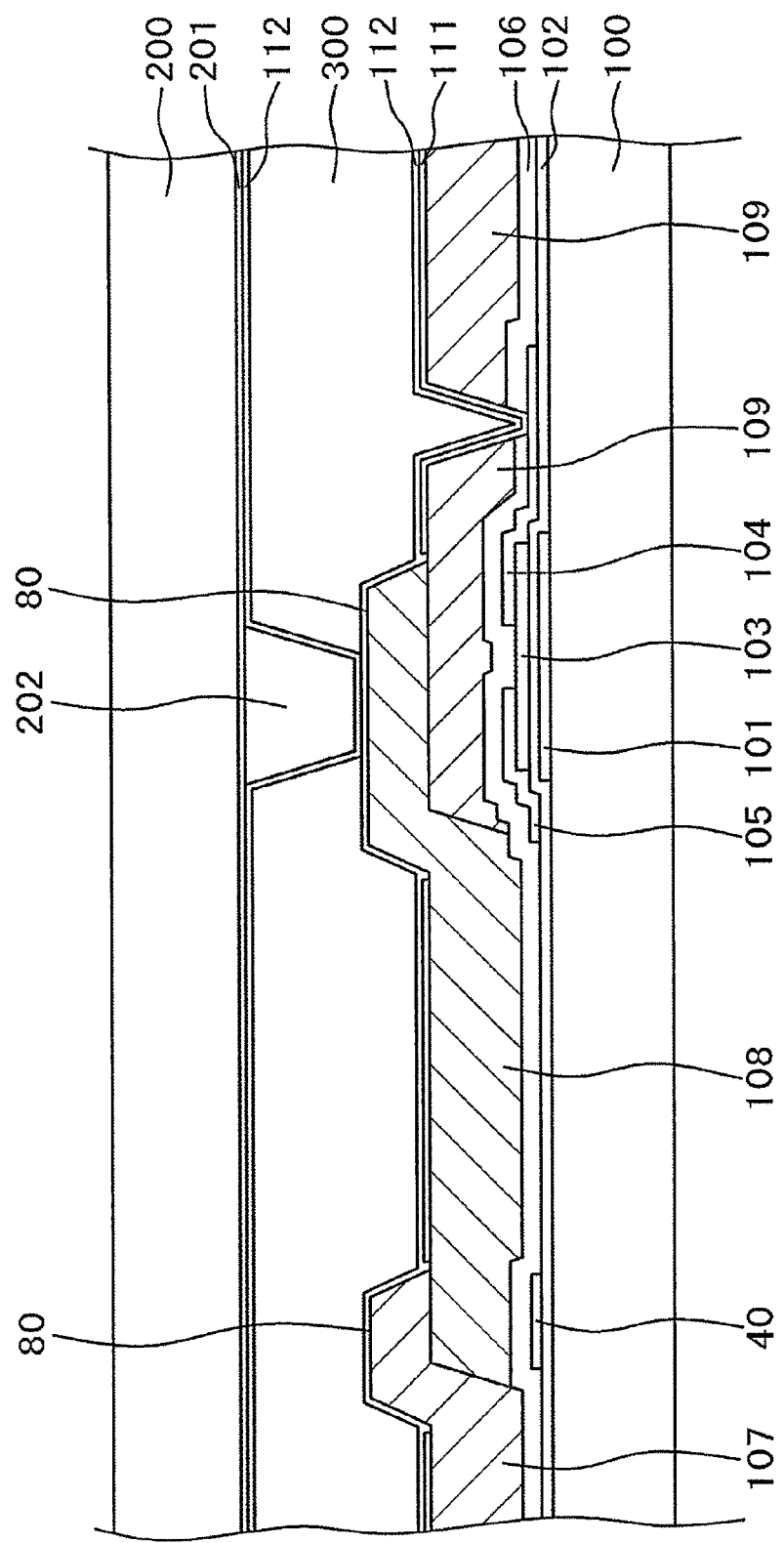
FIG. 2 is a cross-sectional view of a display area of the liquid crystal display device according to a first embodiment.

FIG. 2 is a cross-sectional view of the configuration of the display area 10 of FIG. 1. FIG. 2 shows a cross section of the liquid crystal display device of the so-called TN (Twisted Nematic) type. It is to be understood that the present invention is not limited to this type. The present invention can also be applied to liquid crystal display devices of IPS (In Plane Switching) type, VA (Vertical Alignment) type, or other types.

In FIG. 2, a TFT is formed on the TFT substrate 100. A gate electrode 101 of Al or other metal is formed on the TFT substrate 100. Then, a gate insulating film 102 of, for example, SiN is formed to cover the gate electrode 101 on the TFT substrate 100. A semiconductor layer 103 of, for example, a-Si is formed on the gate insulating film 102. The thickness of a-Si is, for example, 150 nm. In this embodiment, the semiconductor layer 103 uses a-Si. However, poly-Si can also be used for the semiconductor layer 103. The thickness of the semiconductor layer 103 of poly-Si is about 50 nm. The present invention can also be applied to the semiconductor layer 103 of poly-Si, although the configuration of TFT is different in the use of poly-Si.

A drain electrode 105 and a source electrode 104 of, for example, Al are formed on both sides of the semiconductor layer 103. An n+Si layer not shown for an ohmic contact is formed between the semiconductor layer 103, and the drain electrode 105 and the source electrode 104. The thickness of the n+Si layer is, for example, about 50 nm. The drain electrode 105 is connected to an image signal line 40. The source electrode 104 is connected to a pixel electrode 111. The TFT is formed by the process described above. Further, in FIG. 2, the image signal line, which is formed in the same layer of the drain electrode 105, is formed on the gate insulating film 102.

An inorganic passivation film 106 is formed to cover the TFT and the image signal line. The inorganic passivation film 106 has a role to protect the TFT from impurity. The inorganic passivation film 106 is formed, for example, from SiN with a thickness of about 400 nm.

Color filters are formed on the inorganic passivation film 106. The color filters are formed by photo processing from a photosensitive resin in which a pigment is dispersed. The color filters of each pixel are provided with different colors. In FIG. 2, a blue color filter 109 is formed in the pixel including the TFT on the right side. A green color filter 108 is formed in the pixel in the center. A red color filter 107 is formed in the pixel on the left side. In FIG. 2, the TFT is shown only in the pixel of the blue color filter 109, but actually is formed in all the pixels.

In FIG. 2, the color filters overlap to form a boundary portion of each pixel. When the color filters are formed to overlap with each other, it is found to have characteristics of light shielding film. In this embodiment, the color filters are formed to overlap with each other in the boundary of each pixel in order to obtain the necessary light shielding effect, without separately forming a black matrix on the TFT substrate 100. As a result, it is possible to omit the additional process for forming the black matrix.

Figure 3:
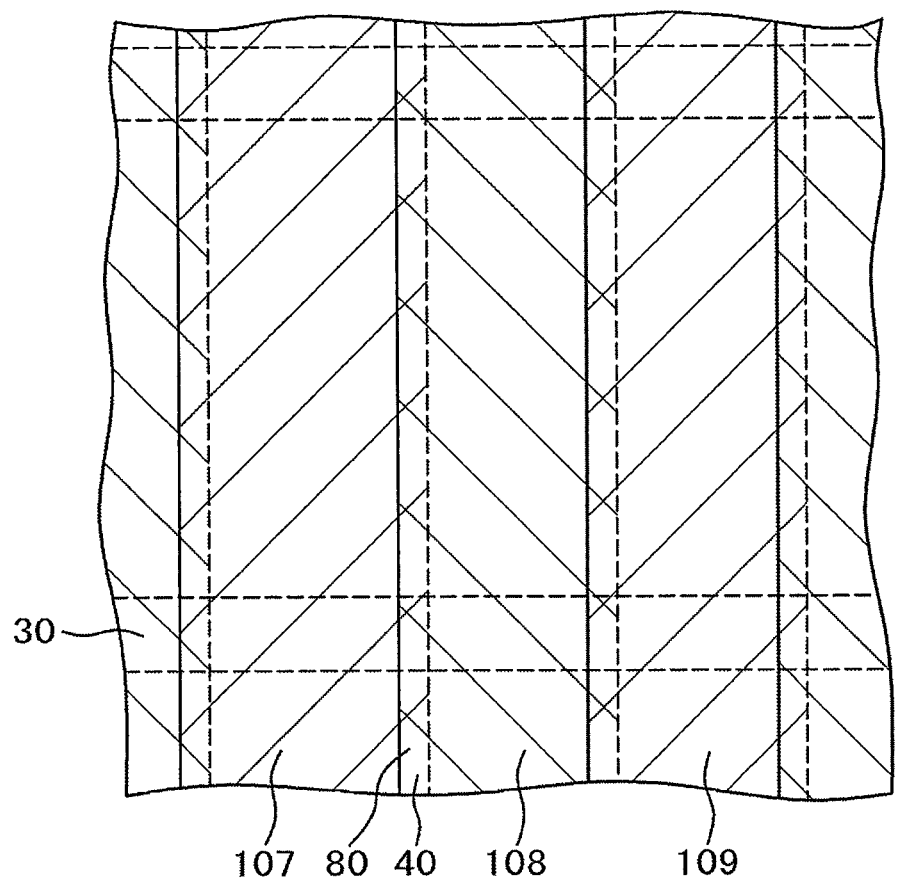
FIG. 3 is a top view of the arrangement of color filters in a TFT substrate.

FIG. 3 is a top view of only the image signal lines, the scan lines, and the red, green, blue color filters in the display area 10. In FIG. 3, the scan lines extend in the lateral direction and are arranged in the vertical direction. Further, the image signal lines extend in the vertical direction and are arranged in the lateral direction. The areas surrounded by the scan lines and the image lines are pixels.

The color filters are formed in a strip shape to cover the image signal lines on both sides of each pixel. Thus, two color filters are formed to overlap with each other on the image signal line. A light shielding film 80 is formed in the overlapping portion of the two color filters. Although not shown in FIG. 3, the light shielding film 80 with the same configuration is also formed on the TFT. The color filters are formed by photo processing to leave each color filter in the desired location. In this way, it is possible to form the overlapping portion of the color filters, or the light shielding film 80, in any location.

Returning to FIG. 2, the pixel electrode 111 is formed on the color filter in the pixel area. The pixel electrode 111 is connected to the source electrode 104 by a through hole formed in the color filter and the inorganic passivation film 106. The pixel electrode 111 is formed from ITO with a thickness of, for example, 70 μm. An orientation film 112 for orienting the liquid crystal is formed to cover the pixel electrode 111. In this embodiment, the orientation film 112 is applied by inkjet printing, and then is burned and solidified.

In FIG. 2, the counter substrate 200 is disposed opposite to the TFT substrate 100. In the counter substrate 200, a counter electrode 201 is formed from ITO. A columnar spacer 202 is formed on the counter substrate 200 to define the distance between the TFT substrate 100 and the counter substrate 200. The columnar spacer 202 comes into contact with the color filters constituting the light shielding film 80 to define the distance between the TFT substrate 100 and the counter substrate 200.

The orientation film 112 is formed to cover the counter electrode 201 and the columnar spacer 202. In this embodiment, the orientation film 112 on the side of the counter electrode 201 is also applied by inkjet printing, and then is burned and solidified. A liquid crystal layer 300 is interposed between the TFT substrate 100 and the counter substrate 200. The liquid crystal layer 300 is sealed by the sealing material 15 as shown in FIG. 1.

Figure 4:
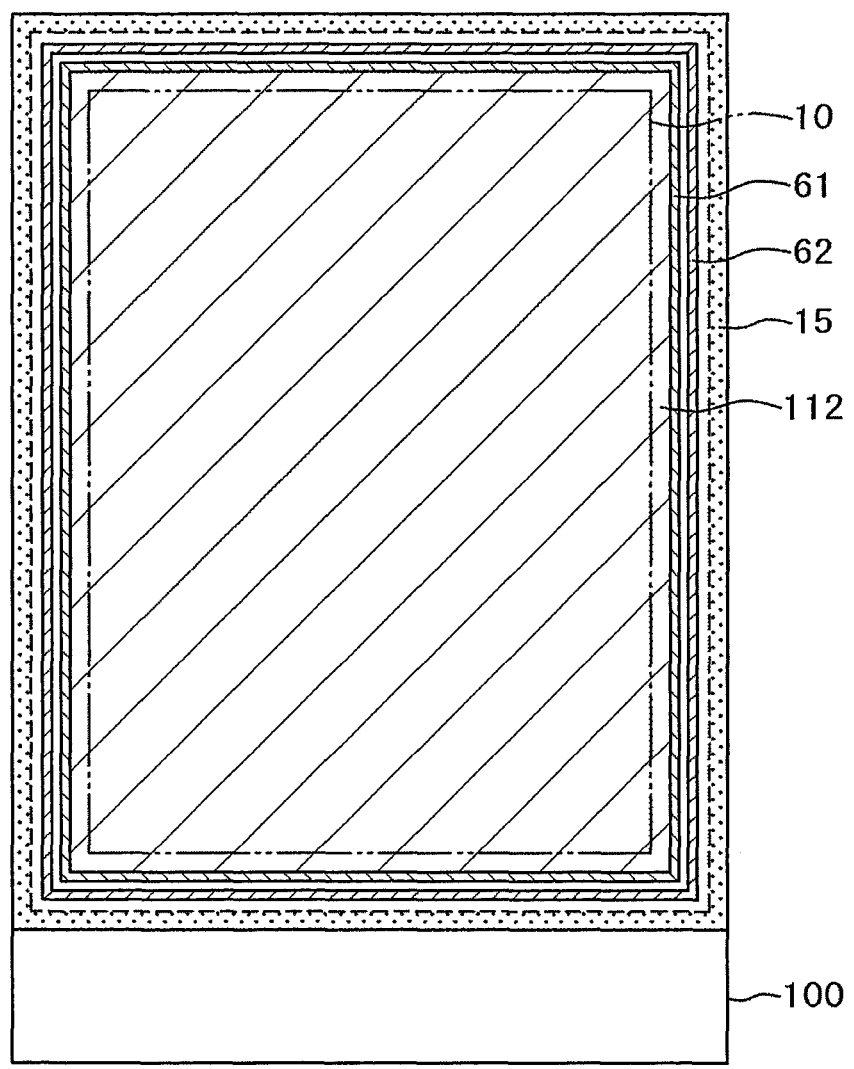
FIG. 4 is a top view of the TFT substrate according to the first embodiment.

FIG. 4 is a top view of the side of the TFT substrate 100. In FIG. 4, the sealing material 15 is formed in the portion of the TFT substrate 100 to which the counter substrate 200 is bonded. The orientation film stopper is formed between the outer periphery of the display area 10 and the sealing material 15. The orientation film stopper has a two-stage structure of the first orientation film stopper 61 and the second orientation film stopper 62.

In order to apply the orientation film 112 by inkjet printing, it is necessary to reduce the viscosity of the orientation film 112. When the viscosity of the orientation film 112 is reduced, the orientation film 112 flows. This makes it difficult to define the area of the orientation film 112, in particular, on the outside of the display area 10. When the orientation film 112 flows to the portion in which the sealing material 15 is formed, the adhesive force of the sealing material 15 is reduced. This leads to a problem with the reliability of the sealing portion.

In the present invention, as shown in FIG. 4, the orientation film stopper is formed to define the area to which the orientation film 112 should be applied. The orientation film stopper has the two-stage structure. In this way, when the orientation film 112 flows beyond the first orientation film stopper 61, the second orientation film stopper 62 can prevent the orientation film 112 from flowing to the outside of the display area 10. Here, when one stage of orientation film stopper can prevent the flow of the orientation film 112, a one-stage structure can be used. It is also possible to use a three- or more-stage structure when two stages of orientation film stopper are not sufficient to prevent the outflow of the orientation film 112.

Figure 5:
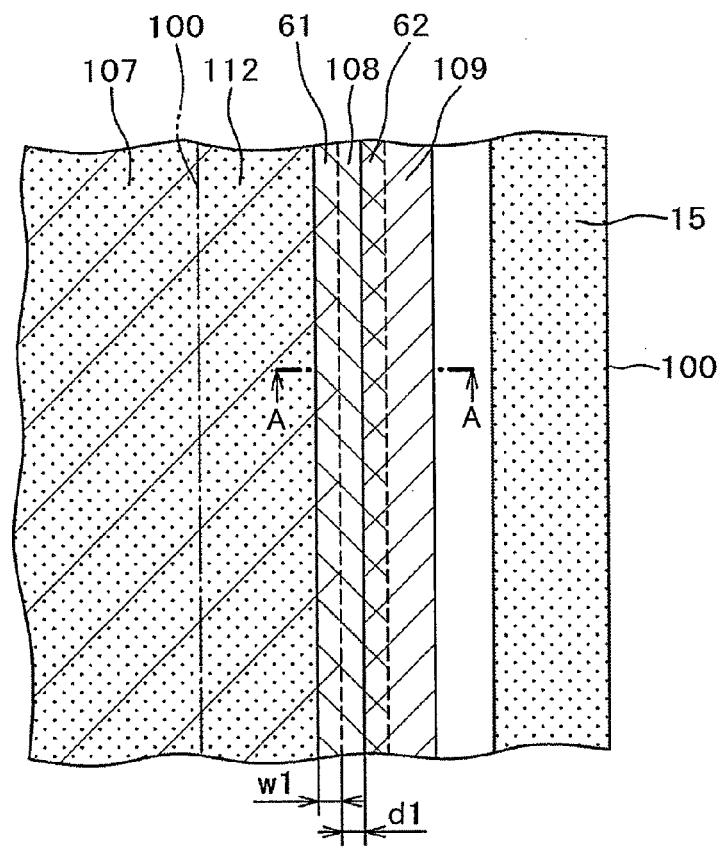
FIG. 5 is a top view of the periphery of the TFT substrate according to the first embodiment.
Figure 6:
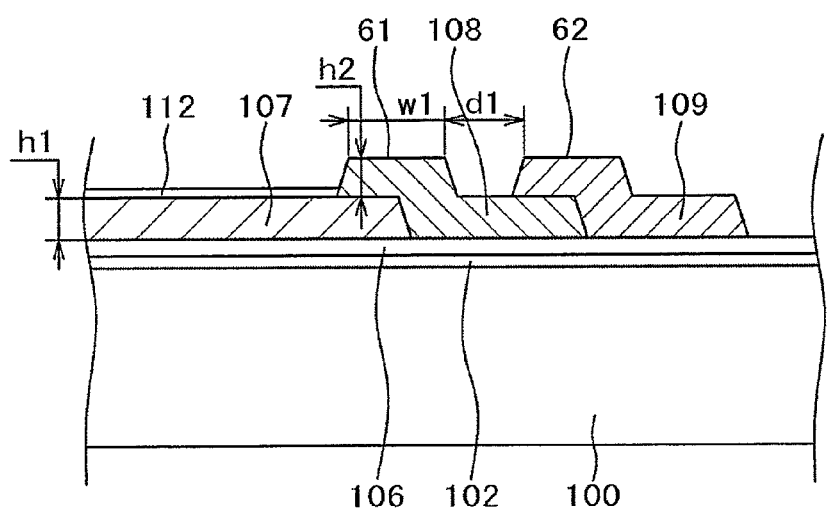
FIG. 6 is a cross-sectional view taken along line A-A of FIG. 5.

FIG. 5 is a detailed top view of the periphery of FIG. 4. FIG. 6 is a cross-sectional view taken along line A-A of FIG. 5. In FIG. 5, the sealing material 15 is formed in the end portion of the TFT substrate 100. The first and second orientation film stoppers 61 and 62 are formed by color filters between the end portion of the display area 10 and the sealing material 15. The orientation film 112 is defined by the first orientation film stopper 61.

FIG. 6 is a cross-sectional view taken along line A-A of FIG. 5, showing the configuration of the orientation film stopper. In FIG. 6, the gate insulating film 102 and the inorganic passivation film 106 are formed on the TFT substrate 100, on which the color filters are formed. In FIG. 6, the pixel in the outermost periphery is the red pixel, so that the red color filter 107 extends to the periphery.

The green color filter 108 is formed to partially overlap the end of the read color filter 107. The red color filter 107 and the green color filter 108 overlap with each other to form the first orientation film stopper 61. The blue color filter 109 is formed to partially overlap the end of the green color filter 108. The green color filter 108 and the blue color filter 109 overlap with each other to form the second orientation film stopper 62.

In FIG. 6, the outer periphery of the orientation film 112 applied by inkjet printing is defined by the first orientation film stopper 61. Thus, when the viscosity of the orientation film 112 is small, the orientation film 112 does not flow to the outside of the first orientation film stopper 61. However, if any defect is present in the first orientation film stopper 61, the orientation film 112 may flow to the outside of the first orientation film stopper 61. In this case, the outflow of the orientation film 112 can be prevented by the second orientation film stopper 62.

In FIG. 6, a width w1 of the first and second orientation film stoppers 61 and 62 is about 10 μm. Also, a distance d1 between the first and second orientation film stoppers 61 and 62 is about 10 μm. However, w1 and d1 can be set to an arbitrary value.

In FIG. 6, a thickness h2 of the upper color filter and a thickness h1 of the lower color filter are substantially equal to each other, about 2 μm. However, the thickness h2 of the upper color filter is often slightly smaller than the thickness h1 of the lower color filter. This is due to the leveling effect in the application of the color filter. The upper color filter with a thickness of about 1 μm is sufficient to prevent the outflow of the orientation film 112.

In the display area 10 shown in FIG. 2, the light shielding film 80 is formed by the overlapping portion of the two color filters, in which the thickness of the upper color filter may be made much smaller than the thickness of the lower color filter. This is because the presence of a large step between the color filters may have effect on the orientation of the liquid crystal. In such a case, the upper color filter, which is formed as the orientation film stopper in the periphery, should have a greater thickness than the thickness of the upper color filter formed as the light shielding film 80 of the display area 10.

Such a configuration can be provided, for example, by increasing the amount of overlap between the lower and upper color filters in the periphery. In other words, the greater the amount of overlap between the lower and upper color filters, the smaller the reduction in the film thickness of the upper color filter due to the leveling effect.

Another method of reducing the thickness of the upper color filter more within the display area 10 than in the periphery of the display area 10 is to pattern the upper color filter by half exposure in the overlapping portion in the display area 10. The cross-linking reaction in the half exposed portion does not progress further than in the fully exposed portion. Thus, the color filter is formed thin in the half exposed portion after it is developed.

As described above, it is possible to arbitrarily set the shape of the light shielding film 80 formed by the overlapping of the color filters in the display area 10, as well as the shape of the orientation film stopper formed by the overlapping of the color filters in the outside of the display area 10. Further, the light shielding film 80 in the display area 10 and the orientation film stopper in the outside of the display area 10 can be formed at the same time. Thus, the number of processes remains unchanged.

The above description focuses on the configuration in which the orientation film 112 is formed by inkjet printing on the side of the TFT substrate 100. The orientation film 112 should be formed also on the side of the counter substrate 200. In the case of forming the orientation film 112 on the side of the counter substrate 200, the use of inkjet printing is advantageous in terms of the production cost.

Figure 7:
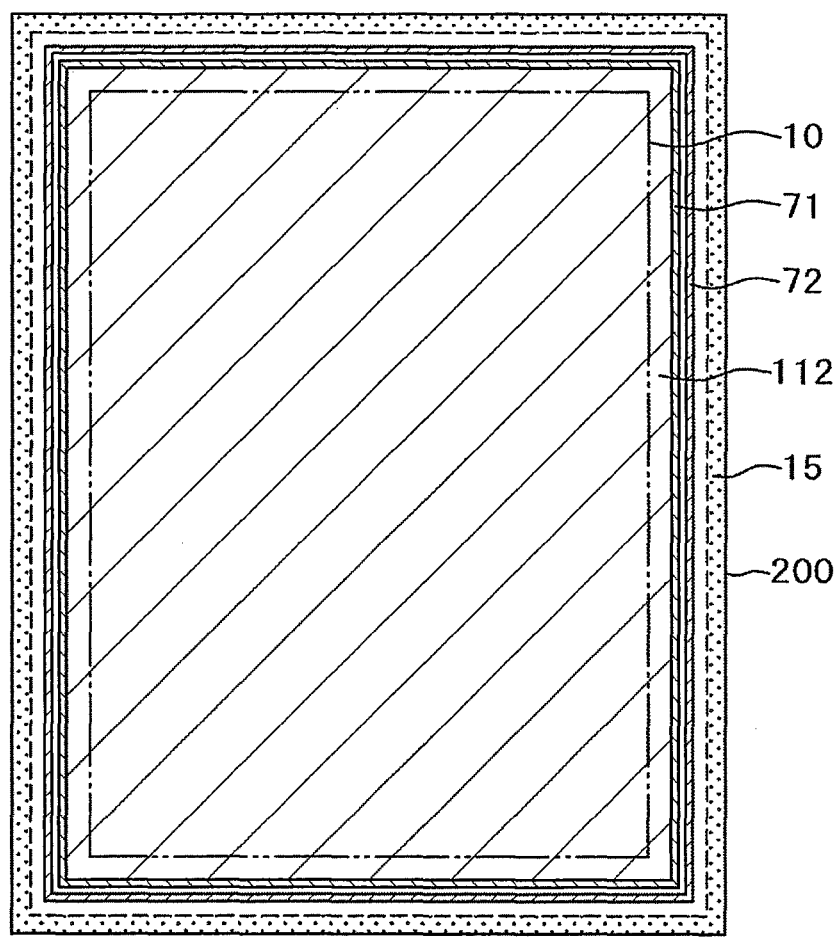
FIG. 7 is a top view of a counter substrate according to the first embodiment.

FIG. 7 is a top view of the side of the counter substrate 200. In FIG. 7, the sealing material 15 is formed in a portion of the counter substrate 200 to which the TFT substrate 100 is bonded. The orientation film stopper is formed between the outer periphery of the display area 10 and the sealing material 15. The orientation film stopper has a two-stage structure of a third orientation film stopper 71 and a fourth orientation film stopper 72.

In order to apply the orientation film 112 by inkjet printing, it is necessary to reduce the viscosity of the orientation film 112 when it is applied. However, the orientation film 112 having a low viscosity flows, making it difficult to define the area of the orientation film 112, in particular, on the outside of the display area 10. This is the same as the case of the TFT substrate 100. When the orientation film 112 flows to the portion in which the sealing material 15 is formed, the adhesive force of the sealing material 15 is reduced. This leads to a problem with the reliability of the sealing portion.

In this embodiment, as shown in FIG. 7, the orientation film stopper is formed to define the area to which the orientation film 112 should be applied. In the counter substrate 200, the orientation film stopper is formed from the same material of the columnar spacer 202 at the same time. Thus, also in the counter substrate 200, there is no additional process in the formation of the orientation film stopper. The orientation film stopper has the two-stage structure. In this way, when the orientation film 112 flows beyond the third orientation film stopper 71, the fourth orientation film stopper 72 can prevent the flow of the orientation film 112 to the outside. This is the same as the case of the TFT substrate 100. Of course, when one stage of orientation film stopper can prevent the flow of the orientation film 112, a one-stage structure can be used. It is also possible to use a three- or more-stage structure when two stages of orientation film stopper are not sufficient to prevent the outflow of the orientation film 112.

Figure 8:
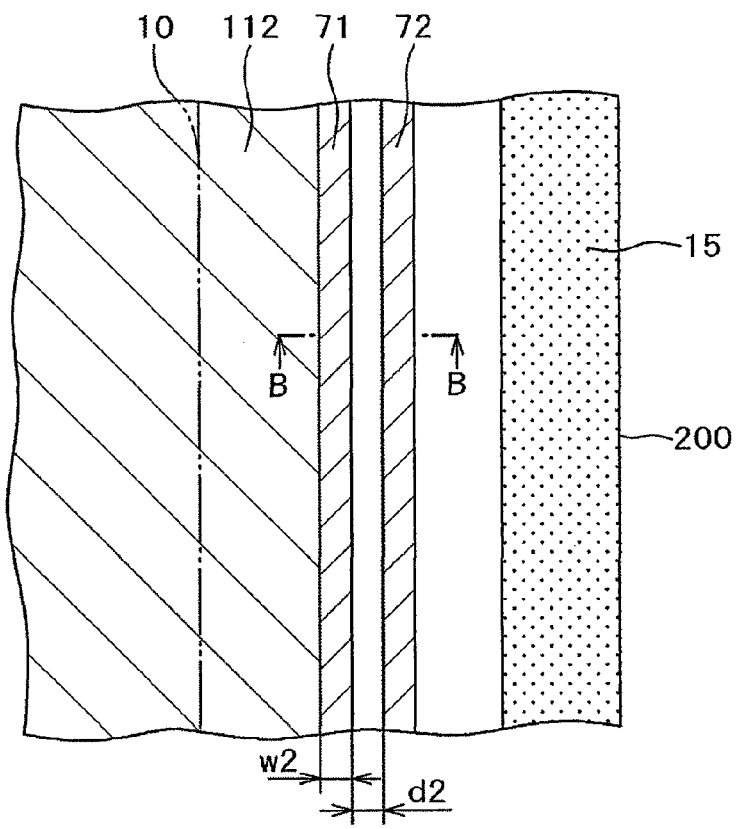
FIG. 8 is a top view of the periphery of the counter substrate according to the first embodiment.
Figure 9:
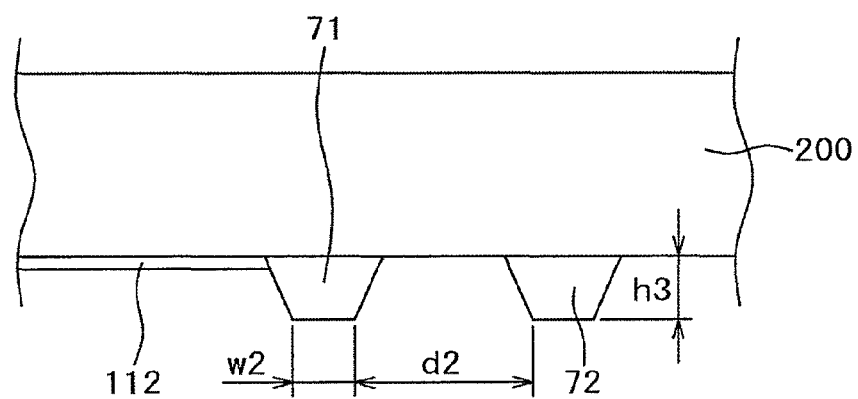
FIG. 9 is a cross-sectional view taken along line B-B of FIG. 8.

FIG. 8 is a detailed top view of the periphery of FIG. 7. FIG. 9 is a cross-sectional view taken along line B-B of FIG. 8. In FIG. 8, the sealing material 15 is formed in the end portion of the counter substrate 200. The third orientation film stopper 71 and the fourth orientation film stopper 72 are formed from the same material and process of the columnar spacer 202, between the end of the display area 10 and the sealing material 15. The orientation film 112 is defined by the end of the third orientation film stopper 71.

FIG. 9 is a cross-sectional view taken along line B-B of FIG. 8, showing the state of the orientation film stopper in the counter substrate 200. In FIG. 9, the third orientation film stopper 71 and the fourth orientation film stopper 72 are formed on the counter substrate 200, by the same process of the columnar spacer 202. The width of the orientation film stopper is, for example, 10 µm. A distance d2 between the orientation film stoppers 72 and 71 is, for example, 10 µm. The orientation film stoppers of the counter substrate 200 are formed in the same manner as the columnar spacer 202, having a height h3 of, for example, about 3 to 5 µm.

In FIG. 9, the profile of the orientation film 112 is defined by the third orientation film stopper 71. In this way, in the counter substrate 200, the use of the third orientation film stopper 71 defines the profile of the orientation film 112, ensuring that the orientation film 112 remains without flowing to the sealing portion. As a result, the reliability of the sealing portion is not reduced. Further, the orientation film stopper of the counter substrate 200 is formed by the same process of the columnar spacer 202, in which there is no increase in the production cost.

Figure 10:
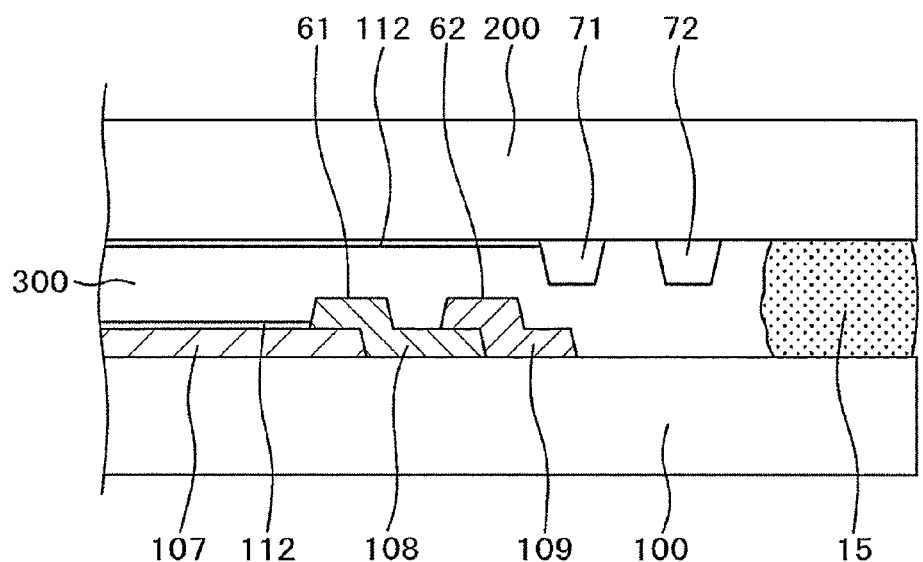
FIG. 10 is a cross-sectional view of the periphery of the liquid crystal display device according to the first embodiment.

FIG. 10 is a cross-sectional view of the periphery of the liquid crystal display panel, in which the TFT substrate 100 and the counter substrate 200 are formed as described above and bonded together. In FIG. 10, the TFT substrate 100 and the counter substrate 200 are bonded together by the sealing material 15 formed in the periphery. The liquid crystal layer 300 is interposed between the TFT substrate 100 and the counter substrate 200.

In the TFT substrate 100, the red color filter 107 extends from the display area 10. The green color filter 108 is formed to overlap the end of the red color filter 107, forming the first orientation film stopper 61. Further, the blue color filter 109 is formed to overlap the end of the green color filter 108, forming the second orientation film stopper 62. The profile of the orientation film 112 of the TFT substrate 100 is defined by the first orientation film stopper 61.

In the counter substrate 200 of FIG. 10, the third orientation film stopper 71 and the fourth orientation film stopper 72 are formed by the same process of the columnar spacer 202. The profile of the orientation film 112 of the counter substrate 200 is defined by the third orientation film stopper 71. The first and second orientation film stoppers 61 and 62 formed in the TFT substrate 100, and the third and fourth orientation film stoppers 71 and 72 formed in the counter substrate 200, are arranged at positions shifted from each other. In this way, the color filters in the display area 10 as well as the columnar spacer 202 are allowed to define the distance between the TFT substrate 100 and the counter substrate 200 in the liquid crystal display panel. As illustrated in FIG. 10, the orientation film stopper 61 or 62 formed by overlapping the portion of the first color filter 107 and the second color filter 108 or by overlapping the portion of the second color filter 108 and the third color filter 109 has a height less than a height of a gap between the TFT substrate 100 and the counter substrate 200 so that the orientation film stopper 61 or 62 formed by overlapping portions of the color filters formed on the TFT substrate does not form a spacer having a height of the gap and a top surface which contacts with the counter substrate 200.

In FIG. 10, the third and fourth orientation film stoppers 71 and 72 in the counter substrate 200 are formed on the outside of the first and second orientation film stoppers 61 and 62 in the TFT substrate 100. However, the reverse arrangement is also possible. In other words, the first and second orientation film stoppers 61 and 62 of the TFT substrate 100 can be formed on the outside of the third and fourth orientation film stoppers 71 and 72 of the counter substrate 200.

Second Embodiment

In the first embodiment, the overlapping portion of the red color filter 107 and the green color filter 108 forms the first orientation film stopper 61 on the side of the TFT substrate 100. Similarly, the overlapping portion of the green color filter 108 and the blue color filter 109 forms the second orientation film stopper 62 on the side of the TFT substrate 100. However, the method of forming the orientation film stopper is not limited to the above example, and other various configurations can also be used.

Figure 11:
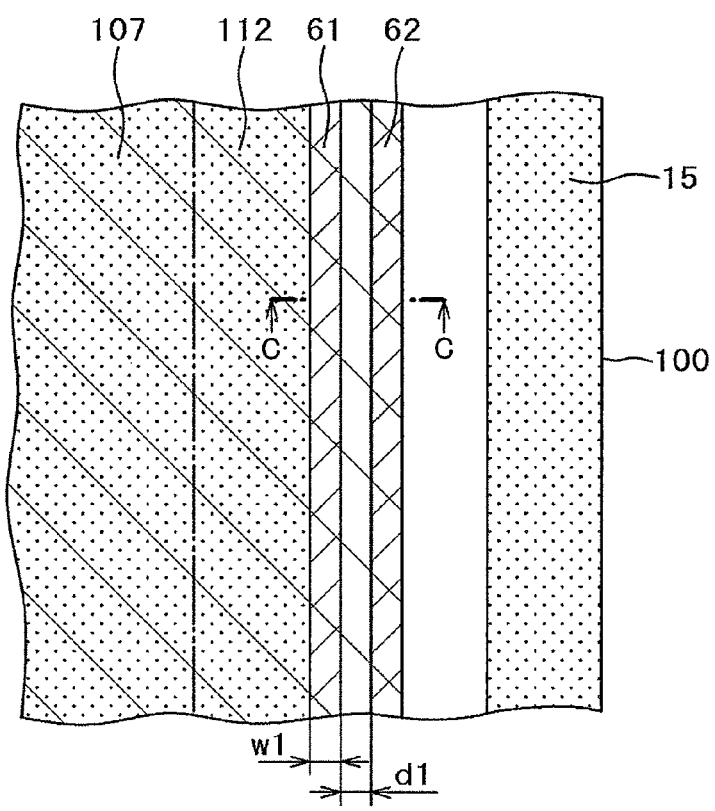
FIG. 11 is a top view of the periphery of the TFT substrate according to a second embodiment.
Figure 12:
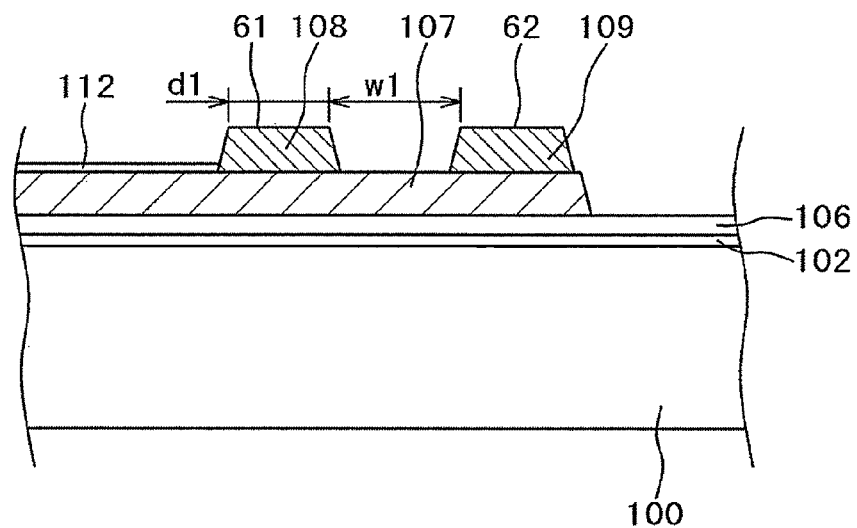
FIG. 12 is a cross-sectional view taken along line C-C of FIG. 11.

FIG. 11 is a top view of another method of forming the orientation film stopper on the side of the TFT substrate 100. FIG. 12 is a cross-sectional view taken along line C-C of FIG. 11. In FIG. 11, the sealing material 15 is formed in the end portion of the TFT substrate 100. The first orientation film stopper 61 and the second orientation film stopper 62 are formed by the color filters between the end of the display area 10 and the sealing material 15. The orientation film 112 is defined by the first orientation film stopper 61. FIG. 11 is different from FIG. 5 of the first embodiment in the method of forming the orientation film stopper.

FIG. 12 is a cross-sectional view taken along line C-C of FIG. 11, showing the configuration of the orientation film stopper. FIG. 12 is the same as FIG. 6 except for the method of forming the orientation film stopper, so that the description of the same configuration will be omitted. In FIG. 12, the red color filter 107 extends to under the blue color filter 109 constituting the second orientation film stopper 62.

Figure 13:
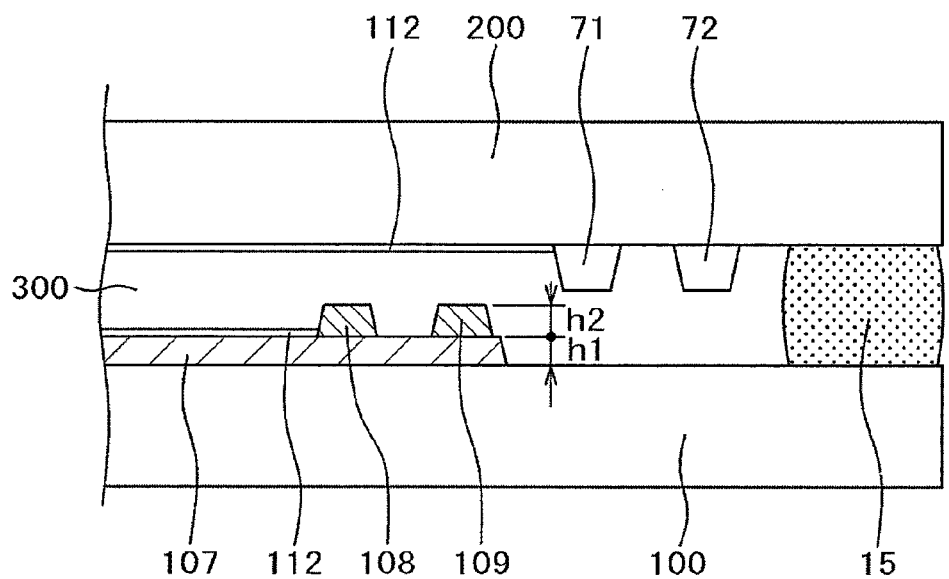
FIG. 13 is a cross-sectional view of the periphery of the liquid crystal display device according to the second embodiment.

The first orientation film stopper 61 is formed by placing the green color filter 108 on the red color filter 107. Further, the second orientation film stopper 62 is formed by placing the blue color filter 109 on the red color filter 107. In this embodiment, the orientation film stopper can be formed without forming a step between the color filters. In FIG. 13, the thickness h1 of the lower color filter and the thickness h2 of the upper color filter are substantially equal to each other. Also in this embodiment, the thickness h2 of the upper color filter can be adjusted by the leveling effect.

FIG. 13 is a cross-sectional view of the periphery of the liquid crystal display panel using the TFT substrate 100 according to this embodiment. FIG. 13 is the same as FIG. 10 except for the method of forming the first and second orientation film stoppers 61 and 62 formed in the TFT substrate 100. The effect of the second embodiment is the same as the effect of the first embodiment.

Third Embodiment

Figure 14:
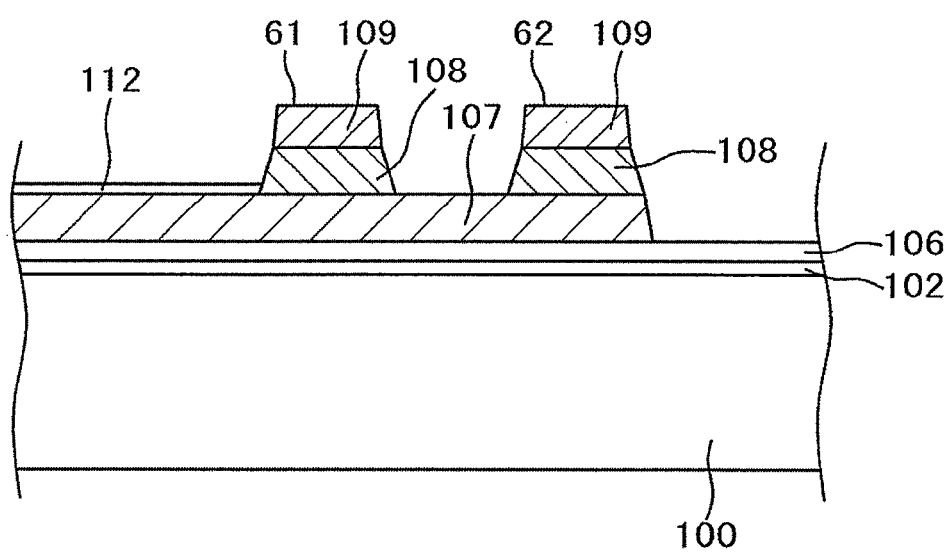
FIG. 14 is a cross-sectional view of the periphery of the TFT substrate according to a third embodiment.

A third embodiment addresses the case in which the height of the orientation film stopper is not sufficient in the formation of the orientation film stopper by the overlapping of the color filters on the TFT substrate 100. FIG. 14 is a cross-sectional view of the periphery of the TFT substrate 100 in this embodiment. The cross-sectional view corresponds to FIG. 12 in the second embodiment.

In FIG. 14, the red color filter 107 extends to the second orientation film stopper 62. The first orientation film stopper 61 is formed by placing the green color filter 108 on the red color filter 107. Then, the blue color filter 109 is further placed on the green color filter 108. The first orientation film stopper 61 is formed by the overlapping of the three color filters. Thus, the height of the orientation film stopper can be made large, even to 4 µm or more. This configuration ensures to prevent the orientation film 112 from flowing to the outside of the display area 10.

The second orientation film stopper 62 has the very same configuration as that of the first orientation film stopper 61, and can be formed by the same process of the first orientation film stopper 61. The third embodiment is the same as the second embodiment in the cross section of the periphery of the liquid crystal display panel formed in such a way that the TFT substrate 100 and the counter substrate 200 are bonded together, except that the first and second orientation film stoppers 61 and 62 have the three-layer structure. Thus, the repeated description will be omitted here.

Fourth Embodiment

Figure 15:
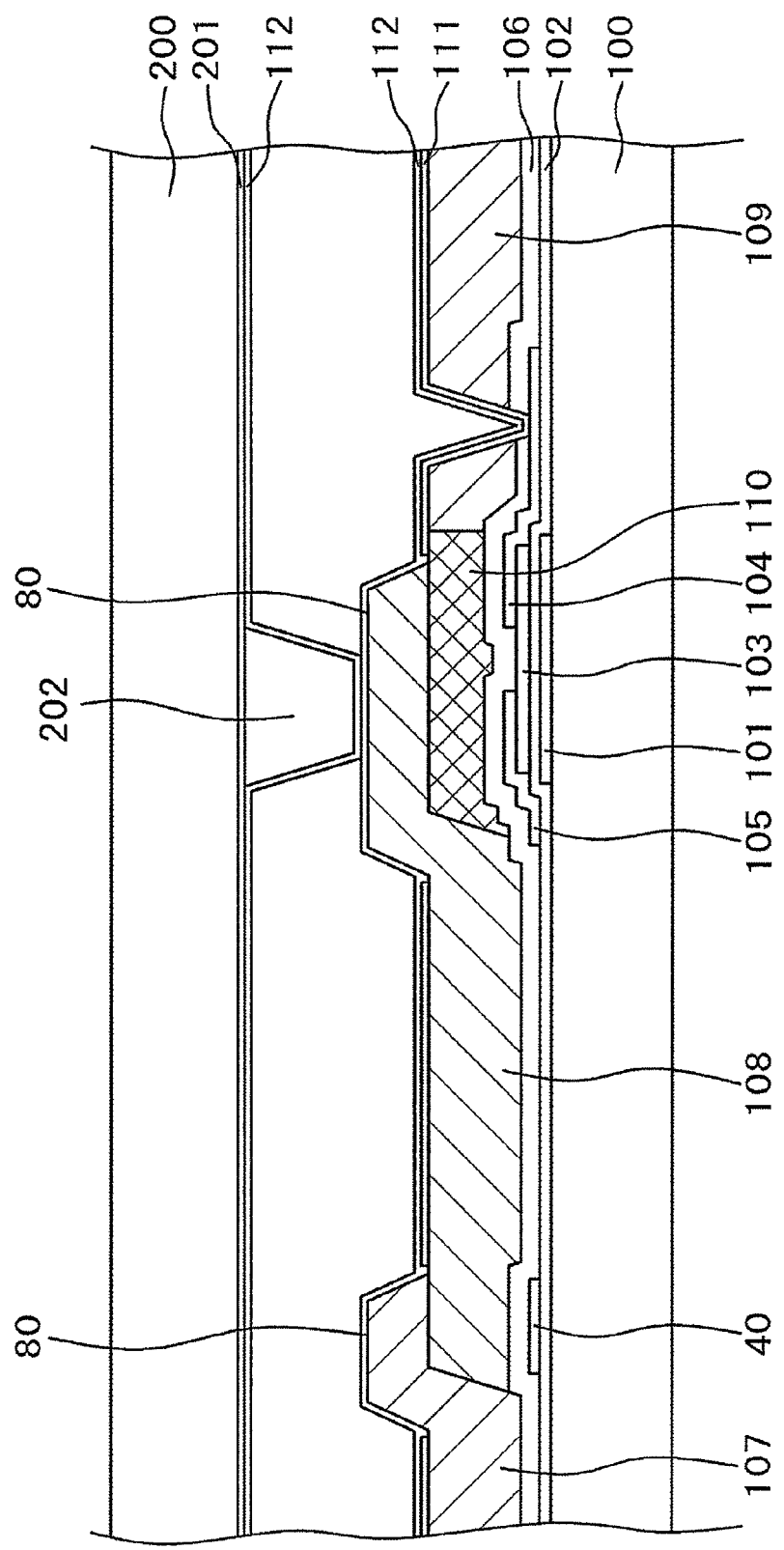
FIG. 15 is a cross-sectional view of the display area of the liquid crystal display device according to a fourth embodiment.

In the above embodiments, the overlapping of the color filters is used as the light shielding film 80 in the display area 10. However, the light shielding film 80 formed by the overlapping of the color filters may not be sufficient to shield, in particular, the TFT from the light. FIG. 15 is a cross-sectional view of the configuration that solves this problem.

In FIG. 15, a black matrix 110 is formed on the TFT substrate 100, in addition to the color filters. The black matrix 110 is formed from a photosensitive resin with titanium black, carbon black, and the like, dispersed therein, having an excellent light shielding property. Also the black matrix 110 is formed by photo processing. In this embodiment, the number of processes is increased by the use of the photo processing. However, the OFF current of the TFT can be reduced, so that the image quality can be increased.

Figure 16:
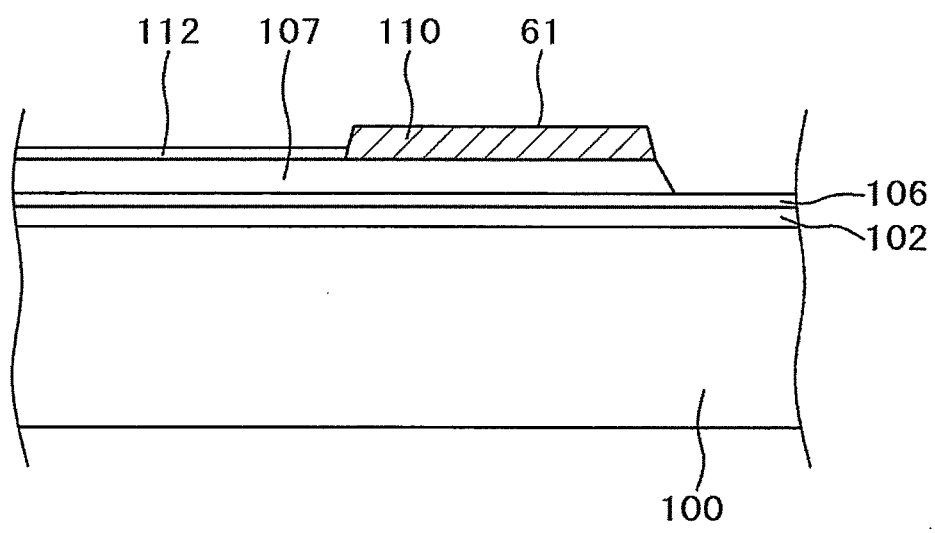
FIG. 16 is a cross-sectional view of the periphery of the TFT substrate according to the fourth embodiment.

Even in the configuration shown in FIG. 15, the present invention can also be applied in the same manner as described in the first to third embodiments. Further, instead of using the color filter, the black matrix 110 can be placed on the upper layer as an orientation film stopper in the periphery. In this case, the black matrix 110 can function as a stopper of the orientation film 112, and can function as means for preventing the reduction in the contrast due to the external light reflection in the periphery. FIG. 16 is a cross-sectional view of the TFT substrate 100 in this state.

In FIG. 16, the red color filter 107 extends to the periphery. The black matrix 110 is formed on the red color filter 107. In this embodiment, the black matrix 110 has only one stage. In other words, the orientation film stopper includes only the first orientation film stopper 61. In FIG. 16, the black matrix 110 is formed wider than the upper fluorescent layer of the first to third embodiments. The wide width of the black matrix 110 prevents the reflection of external light in the periphery. As a result, the contrast can be increased in the periphery of the display.

The above embodiments have been described assuming that the red, green, and blue color filters are formed in this order. However, the order of the formation of the color filters is not limited to this example, and can be set arbitrarily.

What is claimed is:

1. A liquid crystal display device comprising:
   a TFT substrate including a display area in which pixels each having a pixel electrode and a TFT are arranged in a matrix form, and a terminal portion;
   a counter substrate disposed opposite to the TFT substrate;
   a sealing material formed in a periphery of at least one of the TFT substrate and the counter substrate to bond the TFT substrate and the counter substrate together; and
   a liquid crystal layer interposed between an orientation film formed on the TFT substrate and an orientation film formed on the counter substrate;
   wherein a first color filter, a second color filter, or a third color filter is formed corresponding to each of the pixels in the display area of the TFT substrate;
   wherein an orientation film stopper is formed by an overlapping portion of the first color filter, the second color filter, or the third color filter, at least in an area between the display area and the sealing material which is disposed at a side of the terminal portion of the TFT substrate;
   wherein a profile of the orientation film between the display area and the terminal portion of the TFT substrate is defined by the orientation film stopper; and
   wherein the orientation film stopper has a height less than a height of a gap between the TFT substrate and the counter substrate so that a top surface of the orientation film stopper does not contact with the counter substrate.

2. The liquid crystal display device according to claim 1, wherein the orientation film stopper is formed of two layers of color filters.

3. The liquid crystal display device according to claim 1, wherein the orientation film stopper is formed of three layers of color filters.

4. The liquid crystal display device according to claim 1, wherein the terminal portion is formed between the display area and an end of the TFT substrate.

5. A liquid crystal display device comprising:
- a TFT substrate including a display area in which pixels each having a pixel electrode and a TFT are arranged in a matrix form, and a terminal portion;
- a counter substrate disposed opposite to the TFT substrate;
- a sealing material formed in a periphery of one of the TFT substrate and the counter substrate to bond the TFT substrate and the counter substrate together; and
- a liquid crystal layer interposed between an orientation film formed on the TFT substrate and an orientation film formed on the counter substrate;
- wherein a columnar spacer is provided on the counter substrate for defining a distance between the TFT substrate and the counter substrate;
- wherein a first color filter, a second color filter, or a third color filter is formed corresponding to each of the pixels in the display area of the TFT substrate;
- wherein a first orientation film stopper is formed by an overlapping portion of the first color filter, the second color filter, or the third color filter, at least in an area, between the display area and the sealing material which is disposed at a side of the terminal portion of the TFT substrate;
- wherein a profile of the orientation film between the display area and the terminal portion of the TFT substrate is defined by the first orientation film stopper;
- wherein a second orientation film stopper corresponding to the columnar spacer is formed outside of the display area of the counter substrate; and
- wherein a profile of the orientation film formed in the counter substrate is defined by the second orientation film stopper.

6. The liquid crystal display device according to claim 5, wherein the terminal portion is formed between the display area and an end of the TFT substrate.

7. A liquid crystal display device comprising:
- a TFT substrate including a display area in which pixels each having a pixel electrode and a TFT are arranged in a matrix form, and a terminal portion;
- a sealing material formed in a periphery of at least one of the TFT substrate and the counter substrate to bond the TFT substrate and the counter substrate together; and
- a liquid crystal layer interposed between an orientation film formed on the TFT substrate and an orientation film formed on the counter substrate,
- wherein a first color filter, a second color filter, or a third color filter is formed corresponding to each of the pixels in the display area of the TFT substrate;
- wherein a light shielding film is provided on the TFT substrate, in addition to the first color filter, the second color filter, or the third color filter; and
- wherein an orientation film stopper is formed by an overlapping portion of the light shielding film and the first color filter, the second color filter, or the third color filter, at least in an area between the display area and the sealing material which is disposed at a side of the terminal portion of the of the TFT substrate; and
- wherein a profile of the orientation film between the display area and the terminal portion of the TFT substrate is defined by the orientation film stopper.

8. The liquid crystal display device according to claim 7, wherein the terminal portion is formed between the display area and an end of the TFT substrate.

\* \* \* \* \*